US008125479B2

(12) United States Patent
Hayafuji et al.

(10) Patent No.: US 8,125,479 B2

(45) Date of Patent: *Feb. 28, 2012

(54) SELF LIGHT EMITTING TYPE DISPLAY DEVICE

(75) Inventors: Akinori Hayafuji, Yonezawa (JP); Katsuhiro Kanauchi, Yonezawa (JP)

(73) Assignee: Tohoku Pioneer Corporation, Tendo-Shi, Yamagata (JP)

(*) Notice: Subject to any disclaimer, the term of this patent is extended or adjusted under 35 U.S.C. 154(b) by 371 days.

This patent is subject to a terminal disclaimer.

(21) Appl. No.: 12/385,278

(22) Filed: Apr. 3, 2009

(65) Prior Publication Data

US 2009/0244051 A1 Oct. 1, 2009

Related U.S. Application Data

(63) Continuation of application No. 10/919,347, filed on Aug. 17, 2004, now Pat. No. 7,557,802.

(30) Foreign Application Priority Data

Sep. 29, 2003 (JP) ................................ 2003-338104

(51) Int. Cl.
*G06F 3/038* (2006.01)
*G09G 3/30* (2006.01)

(52) U.S. Cl. .............. 345/212; 345/76; 345/77; 345/82; 345/204; 345/211

(58) Field of Classification Search .................... 345/55, 345/76, 77, 80, 82, 84, 87, 90, 92, 204, 211, 345/212, 213, 214

See application file for complete search history.

(56) References Cited

U.S. PATENT DOCUMENTS

| | | | | |
|---|---|---|---|---|
| 3,753,231 | A | 8/1973 | Hilsum | |
| 7,208,294 | B2 | 4/2007 | Tanabe | |
| 7,248,255 | B2 | 7/2007 | Yoshida | |
| 7,295,175 | B2 * | 11/2007 | Hayafuji et al. | 345/212 |
| 7,348,942 | B2 | 3/2008 | Jo | |

(Continued)

FOREIGN PATENT DOCUMENTS

| | | | |
|---|---|---|---|
| JP | 06-348220 | A | 12/1994 |
| JP | 7-36409 | A | 2/1995 |
| JP | 07-036409 | A | 2/1995 |

(Continued)

OTHER PUBLICATIONS

Japanese Office Action dated Nov. 19, 2009, issued in corresponding Japanese Patent Application No. 2003-338104.

*Primary Examiner* — My-Chau T Tran

(74) *Attorney, Agent, or Firm* — Westerman, Hattori, Daniels & Adrian, LLP

(57) ABSTRACT

Treating light emitting elements 2 in all the display pixels in a light emitting display panel as objects, a maximum value of the forward voltages is drawn by a multi-input comparator 3*a* and a peak hold circuit 3*b*. Based on the maximum value of the forward voltages, a voltage boost circuit 6 switching operates a power FET to supply a boosted output by this operation to a constant current circuit 1 as the operational voltage VH. In the case where the maximum value of the forward voltages increases due to trouble or the like and based on this increment the operational voltage VH excessively increases, the operation of the voltage boost circuit 6 is stopped by a control output from an analog comparator 7*a* which functions as voltage limiter.

6 Claims, 11 Drawing Sheets

U.S. PATENT DOCUMENTS

| | | | | |
|---|---|---|---|---|
| 7,471,288 | B2 * | 12/2008 | Hayafuji et al. | 345/213 |
| 7,557,802 | B2 * | 7/2009 | Hayafuji et al. | 345/212 |
| 2004/0041756 | A1 | 3/2004 | Henmi et al. | |
| 2006/0261744 | A1 | 11/2006 | Hayafuji et al. | |

FOREIGN PATENT DOCUMENTS

| | | | |
|---|---|---|---|
| JP | 10-254410 | A | 9/1998 |
| JP | 2003-167550 | A | 6/2003 |
| JP | 2003-255894 | A | 9/2003 |

* cited by examiner

SELF LIGHT EMITTING TYPE DISPLAY DEVICE

This application is a continuation of application Ser. No. 10/919,347 filed Aug. 17, 2004, now U.S. Pat. No. 7,557,802, the entire contents of which are incorporated herein by reference, which is based upon and claims the benefit of priority from the prior Japanese Patent Application No. 2003-338104, filed on Sep. 29, 2003, the entire contents of which are incorporated herein by reference.

BACKGROUND OF THE INVENTION

1. Field of the Invention

The present invention relates to an active drive type or passive drive type light emitting display device in which a large number of light emitting elements, for example represented by organic EL (electroluminescent) elements, are arranged, and particularly to a self light emitting type display device in which light emitting elements can be efficiently driven to be lit by controlling a drive voltage supplied from a power supply circuit which is for driving and lighting the light emitting elements based on the forward voltages of the respective light emitting elements.

2. Description of the Related Art

A display employing a display panel constructed by arranging light emitting elements in a matrix pattern has been developed widely. As the light emitting element employed in such a display panel, an organic EL element in which an organic material is employed in a light emitting layer has attracted attention. This is because of backgrounds one of which is that by employing, in the light emitting layer of the EL element, an organic compound which enables an excellent light emission characteristic to be expected, a high efficiency and a long life which make an EL element satisfactorily practicable have been advanced.

The organic EL element can be electrically shown by an equivalent circuit as shown in FIG. 1. That is, the organic EL element can be replaced by a structure composed of a diode element E and a parasitic capacitance element Cp which is connected in parallel to this diode element, and the organic EL element has been considered as a capacitive light emitting element. When a light emission drive voltage is applied to this organic EL element, at first, electrical charges corresponding to the electric capacity of this element flow into the electrode as a displacement current and are accumulated. It can be considered that when the voltage then exceeds a determined voltage (light emission threshold voltage=Vth) peculiar to the element in question, current begins to flow from the electrode (anode side of the diode element E) to an organic layer constituting the light emitting layer so that the element emits light at an intensity proportional to this current.

FIG. 2 shows light emission static characteristics of such an organic EL element. According to these, the organic EL element emits light at an intensity L approximately proportional to drive current I as shown in FIG. 2A and emits light while current I flows drastically when the drive voltage V is the light emission threshold voltage Vth or higher as shown by the solid line in FIG. 2B. In other words, when the drive voltage is the light emission threshold voltage Vth or lower, current rarely flows in the EL element, and the EL element does not emit light. Therefore, the EL element has an intensity characteristic that in a light emission possible region in which the voltage is higher than the threshold voltage Vth, the greater the value of the voltage V applied to the EL element, the higher the light emission intensity L of the EL element as shown by the solid line in FIG. 2C.

Meanwhile, it has been known that physical properties of the organic EL element change due long-term use so that the forward voltage VF becomes higher. Thus, as shown in FIG. 2B, the V-I characteristic of the organic EL element changes in a direction shown by the arrow (characteristic shown by the broken line) due to an actual use time, and therefore the intensity characteristic is also deteriorated. The organic EL element has a problem that variations in initial intensities also occur due to for example variations in deposition at the time of film formation of this element, and thus it becomes difficult to express intensity gradation faithful to an input video signal.

Further, it has been known that the intensity property of the organic EL element changes due to changes in environmental temperature roughly as shown by broken lines in FIG. 2C. That is, while the EL element has the characteristic that the greater the value of the voltage V applied thereto, the higher the light emission intensity L thereof in the light emission possible region in which the voltage is higher than the light emission threshold voltage as described above, the EL element also has a characteristic that the higher the temperature becomes, the lower the light emission threshold voltage becomes. Accordingly, the intensity of the EL element has a temperature dependency that the higher the temperature becomes, the lower the applied voltage by which light emission becomes possible and that the EL element is brighter at a high temperature time and is darker at a lower temperature time though the same light emission possible voltage is applied.

In general, a constant current drive is performed for the organic EL element due to the reason that the voltage vs. intensity characteristic is unstable with respect to temperature changes while the current vs. intensity characteristic is stable with respect to temperature changes, the reason that it is necessary to prevent the EL element from being deteriorated by an excess current, and the like. In this case, an operational voltage VH, for example produced from a DC/DC converter or the like, which is supplied to a constant current circuit, has to be set, considering the following respective factors.

That is, as the factors, it is possible to enumerate the forward voltage VF of an EL element, a variation part VB of the VF of an EL element, a change-with-time part VL of the VF, a temperature change part VT of the VF, a drop voltage VD necessary for allowing a constant current circuit to perform a constant current operation, and the like. Even when these factors interact synergistically, in order to fully ensure the constant current characteristic of a constant current circuit, the operational voltage VH has to be set at a value obtained by adding maximum values of respective voltages shown as the respective factors.

However, a case where a voltage value obtained by adding maximum values of respective voltages as described above is needed as the operational voltage VH supplied to the constant current circuit hardly occurs, and in a usual state, a large power loss as a voltage drop part in the constant current circuit is brought about. Therefore, this becomes a primary factor of generation of heat, thereby putting stress on organic EL elements, peripheral circuit parts, and the like.

Japanese Patent Application Laid-Open No. H7-36409 (paragraphs 0007 to 0009 and FIG. 1) discloses a countermeasure for dissolving the above-described problems by measuring the forward voltage VF of an EL element and by appropriately controlling the value of the operational voltage VH given to the constant current circuit based on this VF.

In the structure disclosed in Japanese Patent Application Laid-Open No. H7-36409 (paragraphs 0007 to 0009 and FIG. 1), the forward voltage VF of one light emitting element (EL element) arranged in a display panel is detected so that an operational voltage given to a constant current circuit which drives respective light emitting elements is controlled based on the forward voltage of this light emitting element. FIG. 3 shows such a structure in a simple way, wherein reference numeral 1 designates a constant current circuit, and reference numeral 2 indicates a light emitting element represented by an organic EL element whose light emission is controlled by the constant current circuit 1. This structure is constructed in such a manner that the forward voltage VF of the light emitting element 1 generated by supplying constant current from the constant current circuit 1 to a light emitting element 2 is detected by a forward voltage detection circuit 3 so that a detection output by this voltage detection circuit 3 is sent to a comparison/calculation circuit 4.

A voltage setting circuit 5 generating a predetermined voltage (reference voltage) that is a comparison object is connected to the comparison/calculation circuit 4. In the comparison/calculation circuit 4, the reference voltage supplied from the voltage setting circuit 5 and a voltage corresponding to the forward voltage VF supplied from the voltage detection circuit 3 are compared to generate a control voltage corresponding to the difference part of these voltages. The control voltage corresponding to the difference part is supplied to a voltage boost circuit 6 for example made of a switching regulator as a power supply circuit to control the value of an operational voltage (power supply voltage) VH outputted from the voltage boost circuit 6.

In the structure shown in FIG. 3, where the reference voltage supplied from the voltage setting circuit 5 is "Vconstant," the value of the operational voltage VH is controlled so as to follow the relationship of "VH=VF+Vconstant." The operational voltage VH controlled in such a way operates to so as to constant current control the constant current circuit 1, whereby the light emitting element 2 is constant current driven. Therefore, the operational voltage VH which constant current controls the constant current circuit 1 is controlled so as to be changed, taking a voltage margin of the "Vconstant" accompanied by changes of the forward voltage VF of a light emitting element. Accordingly, a voltage drop part generated in the constant current circuit 1 can be restricted within a certain range, and a power loss generated in the constant current circuit 1 can be reduced.

In the structure shown in FIG. 3, as already described, the forward voltage VF of one light emitting element (EL element) arranged in a display panel is detected, and based on this forward voltage, the value of the operational voltage VH given to the constant current circuit which drives respective light emitting elements is controlled. Accordingly, for example as shown in FIG. 4, in a case where a wiring line of the anode side or the cathode side of the light emitting element 2 which becomes a detection object of the forward voltage VF is cut, or in a case where the light emitting element 2 is destroyed or the like, the forward voltage VF is deemed to be raised to an extremely high level of voltage. As a result, the operational voltage VH outputted from the voltage boost circuit 6 provided as a power supply circuit is extremely raised, and a problem that the circuit is damaged or is broken in an extreme condition by the boosted operational voltage VH may develop.

SUMMARY OF THE INVENTION

The present invention has been developed as attention to the above-described problems has been paid, and it is an object of the present invention to provide a self light emitting type display device by which a power loss generated in a constant current circuit which drives and lights light emitting elements can be reduced and further by which an excessive increment of the operational voltage outputted from a power supply circuit due to damage, breakdown, or the like of detection means of the forward voltage of a light emitting element as described above can be restricted effectively.

A self light emitting type display device according to the present invention which has been developed in order to carry out the above-described object is an active drive type light emitting display device comprising a plurality of light emitting display pixels which are arranged at intersecting positions between a plurality of data lines and a plurality of scan lines and which are provided with at least light emitting elements and drive TFTs that give drive current to the light emitting elements, characterized by being constructed in such a manner that respective forward voltages of the light emitting elements constituting the respective pixels are drawn and that a maximum value of the drawn forward voltages in the respective light emitting elements can be obtained.

A self light emitting type display device according to the present invention which has been developed in order to carry out the above-described object is a passive drive type light emitting display device comprising light emitting elements which are respectively connected between a plurality of data lines and a plurality of scan lines at respective intersecting positions between the data lines and the scan lines, characterized by being constructed in such a manner that forward voltages of the light emitting elements are drawn through the respective data lines and that a maximum value of the drawn forward voltages in the respective light emitting elements can be obtained.

DESCRIPTION OF THE PREFERRED EMBODIMENTS

Figure 5:
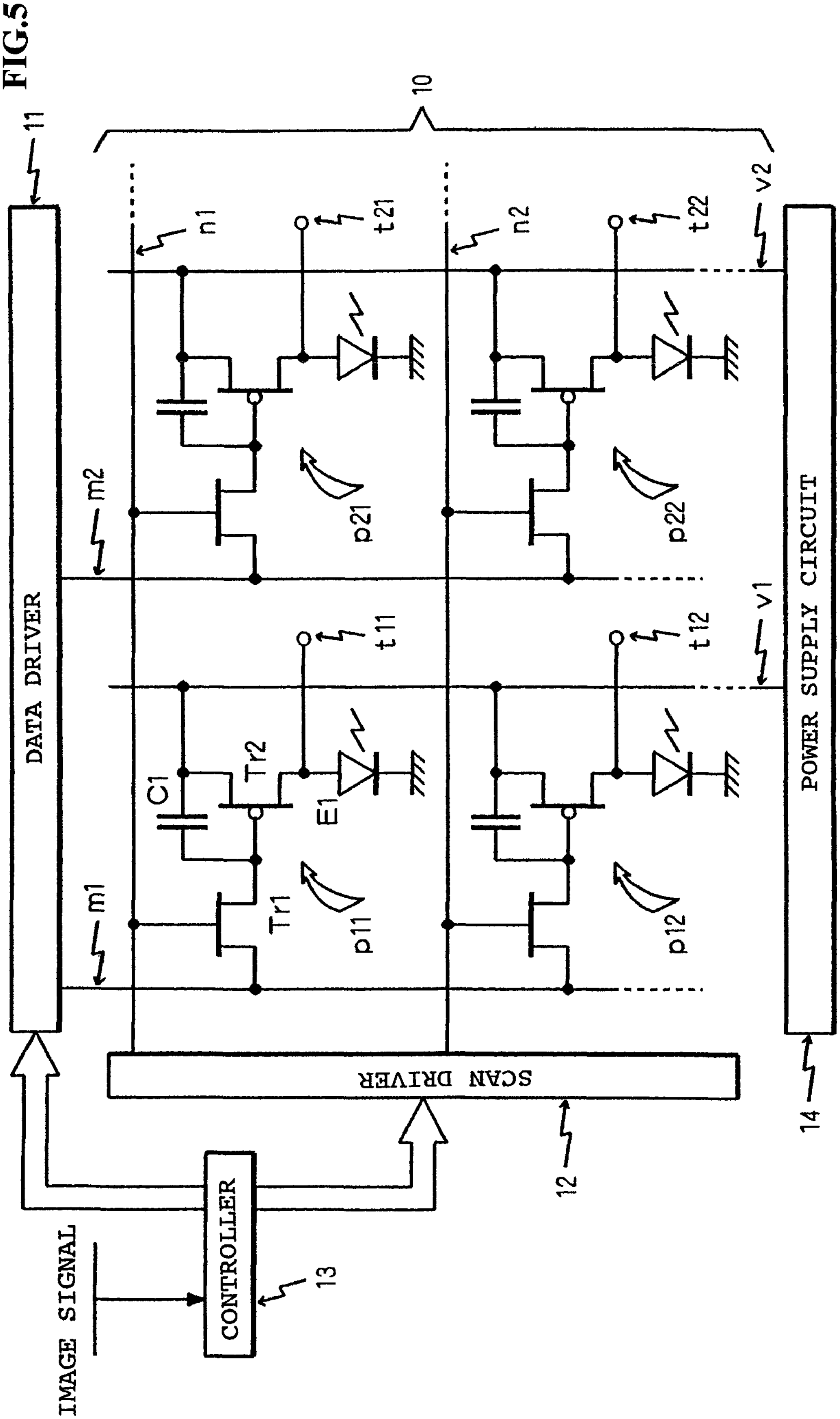
FIG. 5 is a connection diagram showing a structure of a part of an active drive type light emitting display panel to which the present invention can be applied and peripheral circuits thereof.

A self light emitting type display device according to the present invention will be described below with reference to embodiments shown in the drawings. First, FIG. 5 shows an example of a structure of an active drive type light emitting display device to which the present invention can be applied suitably, and in a display panel 10 shown in FIG. 5, four groups of light emitting display pixels p11, p12, p21, p22 are representatively shown among a large number of light emitting display pixels arranged in a matrix pattern. In the light emitting display panel 10, data lines m1, m2, . . . from a data driver which will be described later are arranged in a vertical direction (column direction), and control lines n1, n2, . . . from a scan driver which will be described later similarly are arranged in a horizontal direction (row direction). Further, in the light emitting display panel 10, power supply lines v1, v2, . . . from a power supply circuit which will be described later are also arranged in the vertical direction corresponding to the respective data lines.

For the respective light emitting display pixels, a structure by a conductance control method is shown as an example. That is, as reference numerals are put to respective elements constituting the pixel p11 of the upper left in the display panel 10 shown in FIG. 5, the gate of a control transistor Tr1 constituted by an N-channel type TFT (thin film transistor) is connected to the control line n1, and the source thereof is connected to the data line m1. The drain of the control transistor Tr1 is connected to the gate of a drive transistor Tr2 constituted by a P-channel type TFT and to one terminal of a capacitor C1 which is for maintaining electrical charges.

The source of the drive transistor Tr2 is connected to the other terminal of the capacitor C1 and to the power supply line v1. The anode terminal of the organic EL element E1 as a light emitting element is connected to the drain of the drive transistor, and the cathode terminal of this EL element E1 is connected to a reference potential point (ground). Thus, a large number of light emitting display pixels of the above-described structure are arranged in a matrix pattern in the vertical and horizontal directions on the display panel 10 as described above.

The respective data lines m1, m2, . . . arranged in the vertical direction are drawn from the data driver 11, and the control lines n1, n2, . . . arranged in the horizontal direction are drawn from the scan driver 12 as shown in FIG. 5. A control bus is connected from a controller IC 13 to the data driver 11 and the scan driver 12 so that the data driver 11 and the scan driver 12 are controlled based on an image signal supplied to the controller IC 13, and the respective light emitting display pixels are selectively driven to be lit by an operation as described next so that an image based on the image signal is displayed on the display panel 10.

For example, when an ON voltage is supplied from the scan driver 12 via the control line n1 to the gate of the control transistor Tr1 in the light emitting display pixel p11, the control transistor Tr1 allows current corresponding to a data voltage from the data line m1 supplied to the source thereof to flow from the source to the drain thereof. Accordingly, during a period in which the gate of the control transistor Tr1 is the ON voltage, a voltage corresponding to the data voltage is charged in the capacitor C1, and this voltage is supplied to the gate of the drive transistor Tr2. Accordingly, the drive transistor Tr2 allows current based on the gate voltage and the source voltage (Vgs) thereof to flow in the EL element E1 so that the EL element is driven to emit light. That is, the drive transistor Tr2 operates so that the EL element E1 is driven to emit light by driving the EL element E1 by a constant current.

Meanwhile, when the gate of the control transistor Tr1 becomes an OFF voltage, although the control transistor Tr1 becomes a so-called cutoff so that the drain of the control transistor Tr1 becomes in an open state, the gate voltage of the drive transistor Tr2 is maintained by electrical charges accumulated in the capacitor C1. Therefore, drive current of the drive transistor is maintained until a next scan, whereby light emission of the EL element E1 is also maintained.

In the respective light emitting display pixels of the above-described structure, the drive transistor Tr2 functions as a constant current circuit which drives the respective EL element E1 so that the EL element E1 emits light. This embodiment is constructed in such a manner that the electrical potential of the connection point of the drain of the drive transistor Tr2 functioning as the constant current circuit and of the anode terminal of the EL element is drawn in order to obtain the forward voltage VF of the respective EL element. For convenience of explanation, FIG. 5 shows a state in which drawing terminals t11, t12, t21, t22, . . . are formed at the connection points. As described later, utilizing a maximum value of the respective forward voltages VF obtained by the respective terminals, an operational voltage VH supplied from a power supply circuit 14 to the light emitting display pixels is controlled via the respective power supply lines v1, v2.

Figure 1:
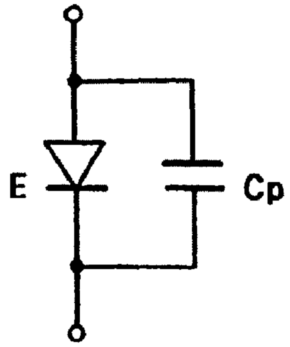
FIG. 1 (Prior Art)
FIG. 1 is a view showing an equivalent circuit of an organic EL element.
Figure 2A:
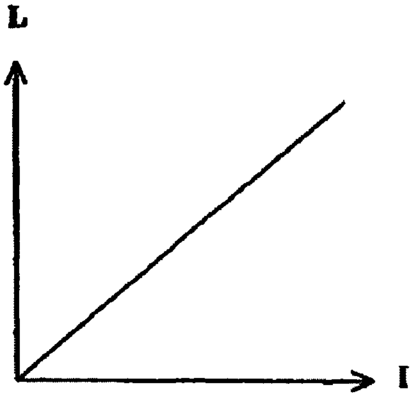
FIG. 2 is views showing characteristics of the organic EL element.
Figure 2B:
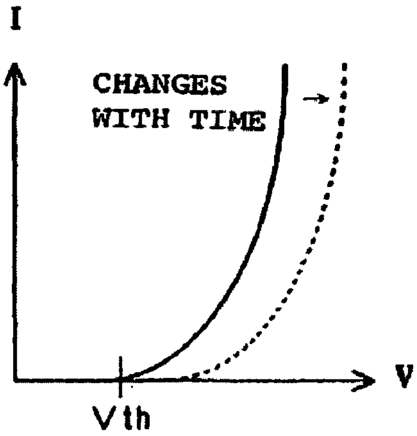
Figure 2C:
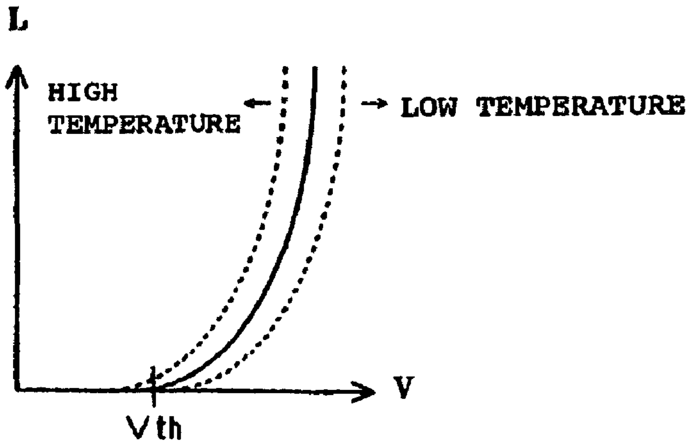
Figure 6:
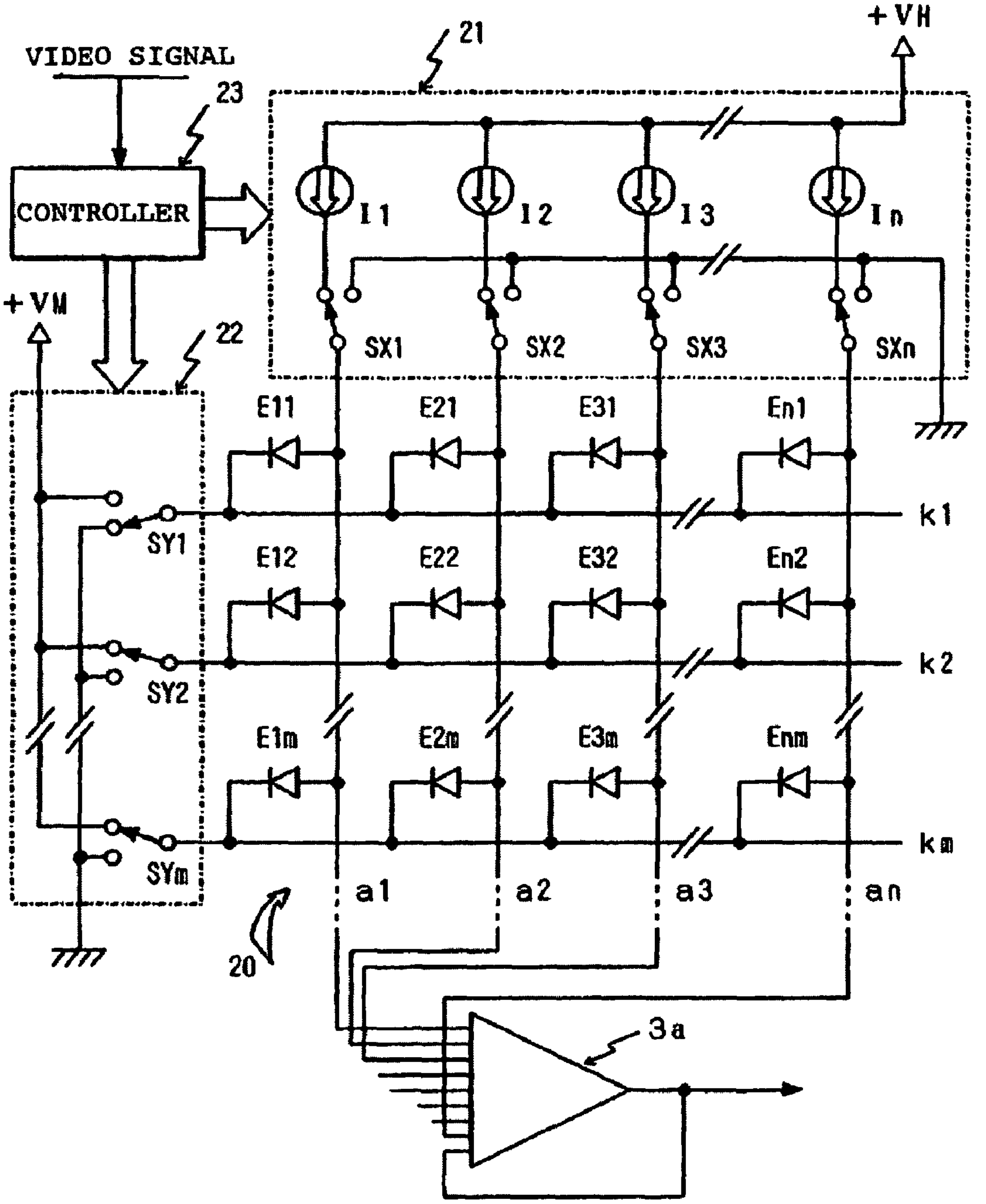
FIG. 6 is a connection diagram showing a structure of a part of a passive drive type light emitting display panel to which the present invention can be applied and peripheral circuits thereof.

Next, FIG. 6 shows an example of a structure of a passive drive type light emitting display device to which the present invention can be applied. There are two methods that are cathode line scan/anode line drive and anode line scan/cathode line drive in drive methods for EL elements in this passive matrix type display device, and the example shown in FIG. 2 shows a form of the former cathode line scan/anode line drive.

That is, anode lines a1 to an as n data lines are arranged in the vertical direction, cathode lines k1 to km as m scan lines are arranged in the horizontal direction, and organic EL elements E11 to Enm denoted by symbols/marks of diodes are connected at portions at which the respective anode lines and cathode lines intersect one another (in total, n×m portions) to construct a display panel 20.

In the respective EL elements E11 to Enm constituting pixels, one ends (anode terminals in equivalent diodes of the EL elements) are connected to the anode lines, and the other ends (cathode terminals in the equivalent diodes of the EL elements) are connected to the cathode lines, corresponding to the respective intersection positions between the anode lines a1 to an provided along the vertical direction and the cathode lines k1 to km provided along the horizontal direction. Further, the respective anode lines a1 to an are connected to an anode line drive circuit 21, and the respective cathode lines k1 to km are connected to a cathode line scan circuit 22, so that the respective anode and cathode lines are driven.

In the anode line drive circuit 21, constant current circuits I1 to In which perform a constant current operation, utilizing an operational voltage VH supplied from a later-described power supply circuit and drive switches SX1 to SXn are provided. The anode line drive circuit 21 operates in such a manner that the drive switches SX1 to SXn are connected to the constant current circuits 11 to In side so that current from the constant current circuits I1 to In is supplied to the respective EL elements E11 to Enm arranged corresponding to the cathode lines. The drive switches SX1 to SXn are constructed so as to be connected to a ground side provided as a reference potential point in the case where the current from the constant current circuits I1 to In is not supplied to the respective EL elements.

The cathode line scan circuit 22 is provided with scan switches SY1-SYm corresponding to the respective cathode lines k1 to km and operates so that either a reverse bias voltage source VM or the ground potential as a scan reference potential point is connected to a corresponding cathode line. Thus, the constant current circuits I1 to In are connected to desired anode lines a1 to an while the cathode lines are set at the scan reference potential point (ground potential) at a predetermined cycle so that the respective EL elements can be allowed to emit light selectively.

The anode line drive circuit 21 and the cathode line scan circuit 22 operate to receive commands from a light emission control circuit 23 constituted by a controller IC to allow the display panel 20 to display an image corresponding to an image signal, in accordance with this image signal supplied to the light emission control circuit 23.

The structure shown in FIG. 6 is constructed such that the electrical potentials of the respective anode lines a1 to an are acquired in order to obtain the forward voltage VF of the respective EL elements E11 to Enm. That is, as described later in detail, the respective electrical potentials at the respective anode lines a1 to an are supplied to a multi-input comparator 3*a*, and the operational voltage VH supplied from a power supply circuit is controlled utilizing the maximum value of the respective forward voltages VF obtained by this multi-input comparator 3*a*.

Figure 7:
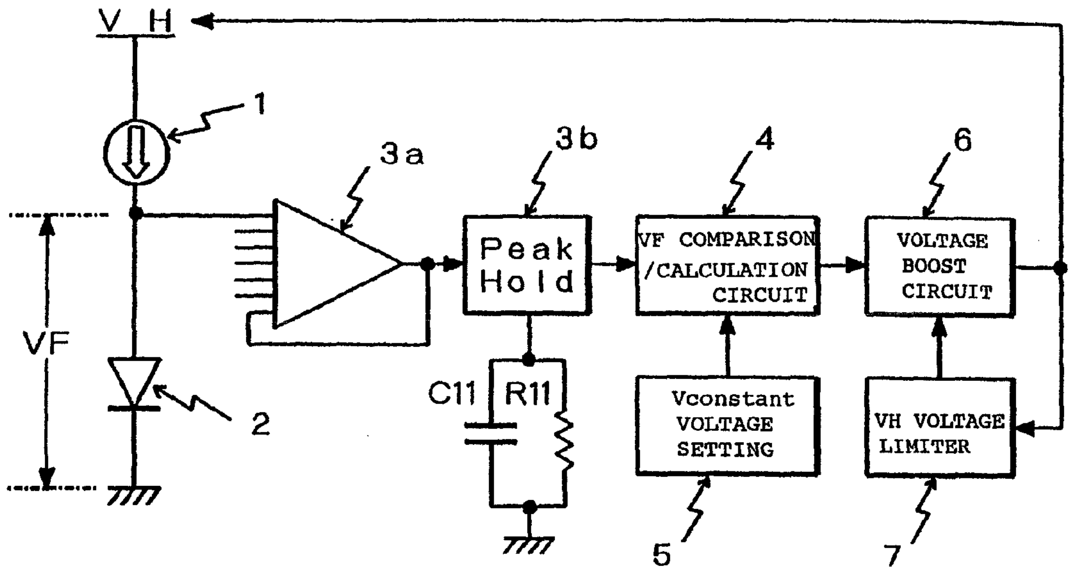
FIG. 7 is a block diagram showing a structure according to the present invention in which an operational voltage is controlled based on the forward voltages of light emitting elements.

FIG. 7 shows a display device of the active matrix structure shown in FIG. 5, or a basic structure in which the forward voltages VF are obtained from the respective EL elements in the display device of the passive matrix structure shown in FIG. 6 to control the operational voltage VH supplied from the power supply circuit. In the case where the display device of the active matrix structure shown in FIG. 5 is applied to the structure in FIG. 7, one set of the drive transistor Tr2 and the EL element E1 which constitute a light emitting display pixel shown in FIG. 5 can be deemed equivalently to be the constant current circuit 1 and the light emitting element 2 shown in FIG. 7.

Thus, the forward voltage VF of the EL element E1 generated at the connection portion of the drive transistor Tr2 and the EL element E1 which constitute a light emitting display pixel is supplied to one input terminal of the multi-input comparator 3*a*. Therefore, in the structure shown in FIG. 7, the respective forward voltages VF of all light emitting elements obtained at the terminals t11, t12, t21, t22, . . . shown in FIG. 5 are supplied to the respective input terminals of the multi-input comparator 3*a*. Thus, as described later, by the maximum value of the forward voltages VF of all the light emitting elements, the operational voltage VH supplied from the power supply circuit is controlled.

Meanwhile, in the case where the display device of the passive matrix structure shown in FIG. 6 is applied to the structure in FIG. 7, the respective electrical potentials drawn from the respective anode lines a1 to an shown in FIG. 6 are led to the multi-input comparator 3*a*. With this structure, as described later, by the maximum value of the forward voltages VF of all the light emitting elements, the operational voltage VH supplied from the power supply circuit is controlled.

As shown in FIG. 7, to the output terminal of the multi-input comparator 3*a*, a peak hold circuit 3*b* provided with a holding capacitor C11 and a discharging resistance element R11 are connected. Accordingly, by a voltage detection circuit composed of the multi-input comparator 3*a* and the peak hold circuit 3*b*, the maximum value of the forward voltages VF of the respective light emitting elements represented by the EL elements arranged in the display panel 10 shown in FIG. 5 or in the display panel 20 shown in FIG. 6 can be obtained.

Figure 3:
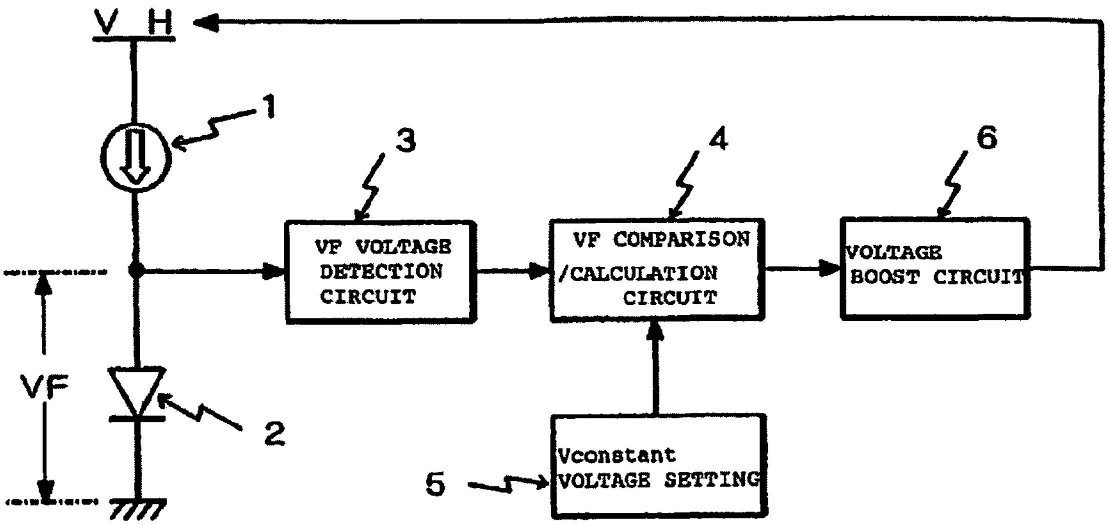
FIG. 3 (Prior Art)
FIG. 3 is a block diagram showing a conventional structure controlling an operational voltage based on the forward voltage of a light emitting element.
Figure 4:
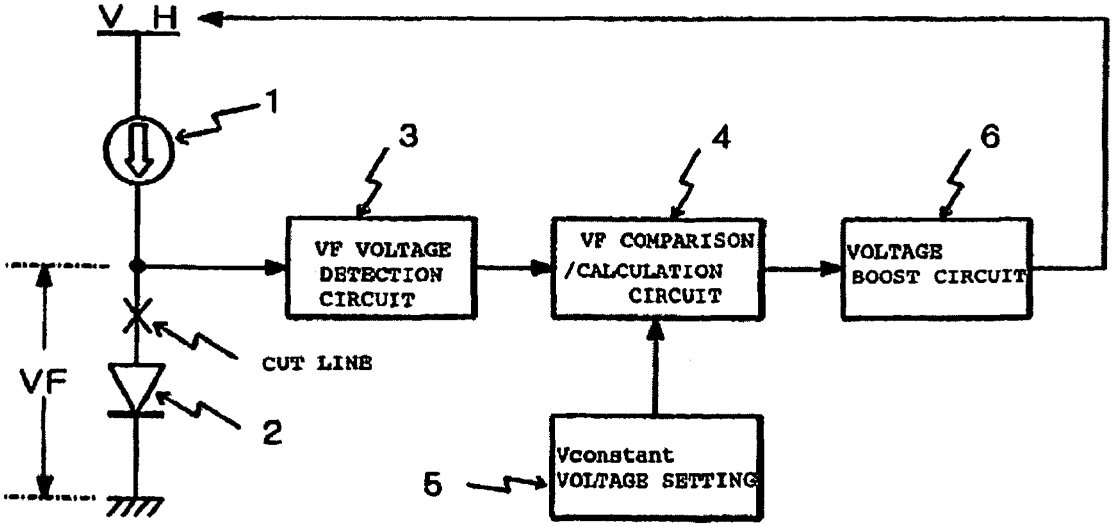
FIG. 4 (Prior Art)
FIG. 4 is a block diagram for explaining operations of a case where trouble occurs in a part of the structure shown in FIG. 3.

The maximum value of the forward voltages VF outputted from the peak hold circuit 3*b* is sent to a comparison/calculation circuit 4. As already described with reference to FIG. 3, in the comparison/calculation circuit 4, a reference voltage supplied from a voltage setting circuit 5 and a voltage corresponding to the maximum value of the forward voltages VF supplied from the peak hold circuit 3*b* are compared, and a control voltage corresponding to a difference part thereof is generated. The control voltage corresponding to the difference part is supplied to a voltage boost circuit 6 for example constituted by a switching regulator as a power supply circuit to operate so as to control the value of the operational voltage (power supply voltage) VH outputted from the voltage boost circuit 6.

That is, in the case where the maximum value of the forward voltages VF outputted from the peak hold circuit 3*b* is "VFmax" and the reference voltage produced from the voltage setting circuit 5 is "Vconstant" in the structure shown in FIG. 7, the value of the operational voltage VH is controlled so as to give a relationship, "VH=VFmax+Vconstant." The operational voltage VH controlled in such a way is supplied from the power supply circuit 14 shown in FIG. 5 to the respective light emitting display pixels p11, p12, p21, p22, . . . via the power supply lines v1, v2, . . . . The operational voltage VH from the power supply circuit controlled as described above is supplied as the operational voltage VH of the constant current circuits I1 to In in the anode line drive circuit 21 shown in FIG. 6.

With the above-described structure, the operational voltage VH from the power supply circuit is controlled taking a voltage margin of the "Vconstant" based on the maximum value "VFmax" of the forward voltages VF of the respective light emitting elements. Therefore, a voltage drop part generated in the constant current circuit 1 shown in FIG. 7 can be restricted within a certain range, and a power loss generated in the constant current circuit 1 can be reduced.

Meanwhile, in the embodiment shown in FIG. 7, provided is a voltage limiter 7 which can detect the operational voltage VH outputted from the voltage boost circuit 6 constituting the power supply circuit and which can set an upper limit value of the operational voltage VH. The voltage limiter 7 shown in this FIG. 7 operates to control a switching characteristic of a switching regulator constituting the voltage boost circuit 6 and to set the upper limit value of the operational voltage VH as described above in the case where the operational voltage VH exceeds a predetermined value.

Figure 8:
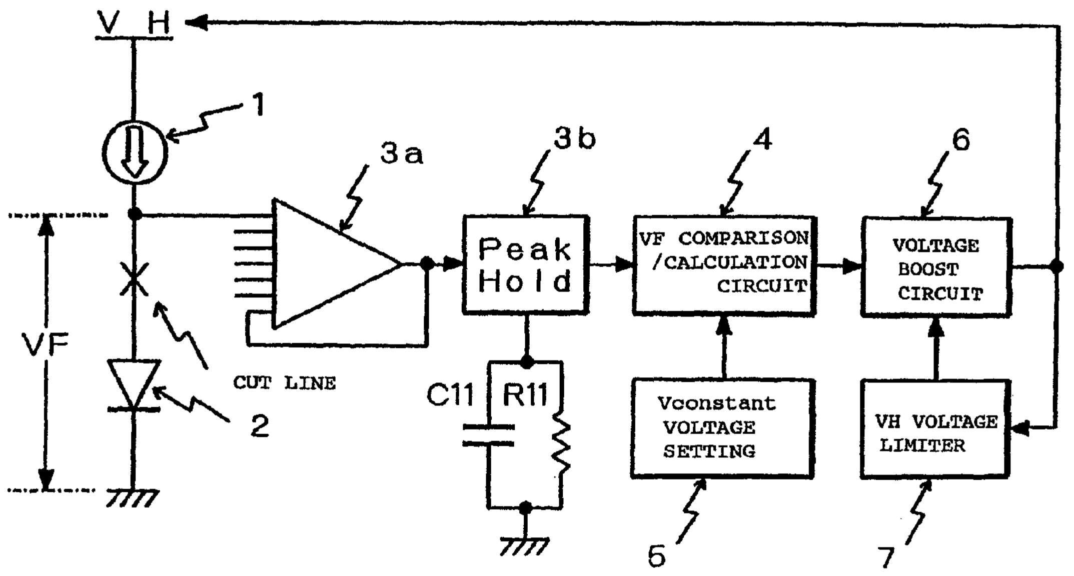
FIG. 8 is a block diagram explaining operations of a case where trouble occurs in a part of the structure shown in FIG. 7.

FIG. 8 is for explaining interactions and effects obtained by the provision of the voltage limiter 7 in the structure shown in FIG. 7. That is, the forward voltage detection circuit composed of the multi-input comparator 3*a* and the peak hold circuit 3*b* as shown in FIG. 8 operates so as to detect the maximum value of the forward voltages VF of the respective light emitting elements arranged in the display panel 10 shown in FIG. 5 or in the display panel 20 shown in FIG. 6.

Here, as shown in FIG. 8, in the case where a wiring line of the anode side or the cathode side of any one of the light emitting elements 2 is broken, or in a case where the light emitting element 2 is broken or the like, from the forward voltage detection circuit composed of the multi-input comparator 3*a* and the peak hold circuit 3*b*, an extremely large forward voltage VFmax is detected. In this case, while the comparison/calculation circuit 4 and the voltage boost circuit 6 operate so as to increase the operational voltage VH based on the extremely large forward voltage VFmax, the voltage limiter 7 operates so as to control the switching characteristic of the switching regulator to prevent the operational voltage VH from being increased to a predetermined value or more. By this operation, a problem that a circuit driven by the operational voltage VH is damaged as receiving the extremely large operational voltage VH or is broken in an extreme condition can be avoided.

Figure 9:
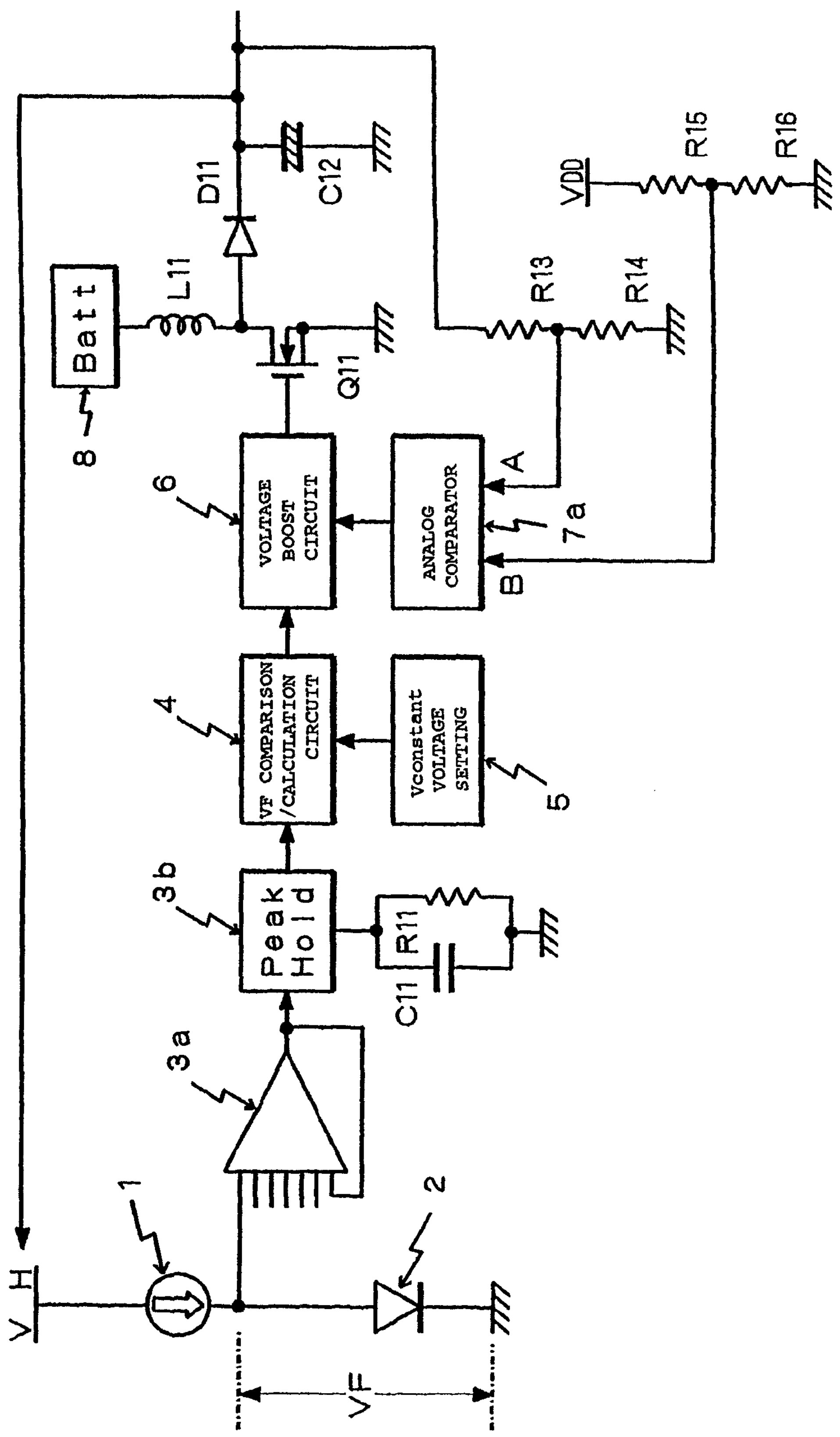
FIG. 9 is a block diagram showing a case where a first example of the voltage limiter shown in FIGS. 7 and 8 is adopted.

FIG. 9 shows a preferred first example of the voltage limiter 7 shown in FIGS. 7 and 8. In FIG. 9, parts corresponding to the respective constituent elements shown in FIGS. 7 and 8 are designated by the same reference characters and numerals, and therefore detailed explanation thereof will be omitted. In the form shown in this FIG. 9, the gate of a MOS type power FET Q11 is connected to the voltage boost circuit 6, and the drain thereof is connected to ground provided as the reference potential point. Further, the source thereof is connected to a positive pole of a battery 8 constituting a primary side power source via an inductor L11.

This voltage boost circuit 6 performs for example PWM (pulse width modulation) control, taking the control voltage from the comparison/calculation circuit 4 as an input to function as a switching regulator which switches the power FET Q11. The voltage boost circuit 6 can also utilize a well-known PFM (pulse frequency modulation) control or PSM (pulse skip modulation) control instead of the PWM control.

A PWM wave based on the control voltage from the comparison/calculation circuit 4 is outputted from the voltage boost circuit 6 functioning as a switching regulator, and the power FET Q11 is controlled to be turned on by the PWM wave. Thus, electrical power energy from the battery 8 of the primary side is accumulated in the inductor L11. The electrical power energy accumulated in the inductor L11 is accumulated in a smoothing capacitor C12 via a diode D11, accompanied by an OFF operation of the power FET Q11. The power FET Q11 repeats the ON/OFF operation in accordance with the duty cycle of PWM based on the control voltage from the comparison/calculation circuit 4, and a direct current output boosted by this operation is outputted as the operational voltage VH.

Meanwhile, the operational voltage VH is divided by resistance elements R13, R14 and is supplied to one input terminal of an analog comparator 7*a* as an analog value A. A voltage obtained by dividing a standard voltage VDD by resistance elements R15, R16 is supplied as an analog value B to the other input terminal of the analog comparator 7*a*. The analog comparator 7*a* compares the analog value B as a standard with the analog value A and operates so as to allow the voltage boost circuit 6 to continue the switching operation thereby in a state of A<B. The analog comparator 7*a* operates so as to stop the switching operation by the voltage boost circuit 6 in the case where a state of A>B is detected. Thus, the ON/OFF operation of the power FET Q11 is stopped, and the boost operation for the operational voltage VH is stopped.

Therefore, in the structural example shown in FIG. 9, the analog comparator 7*a*, voltage dividing circuits by the respective resistance elements R13, R14 and R15, R16, and the like function as the voltage limiter, thereby operating so as to set an upper limit value of the operational voltage VH. In the structural example shown in FIG. 9, in the case where the switching operation by the voltage boost circuit 6 is stopped by the condition that analog values are A>B, an operation form in which it is considered that breakdown or running out of lifetime has occurred can be taken.

Figure 10:
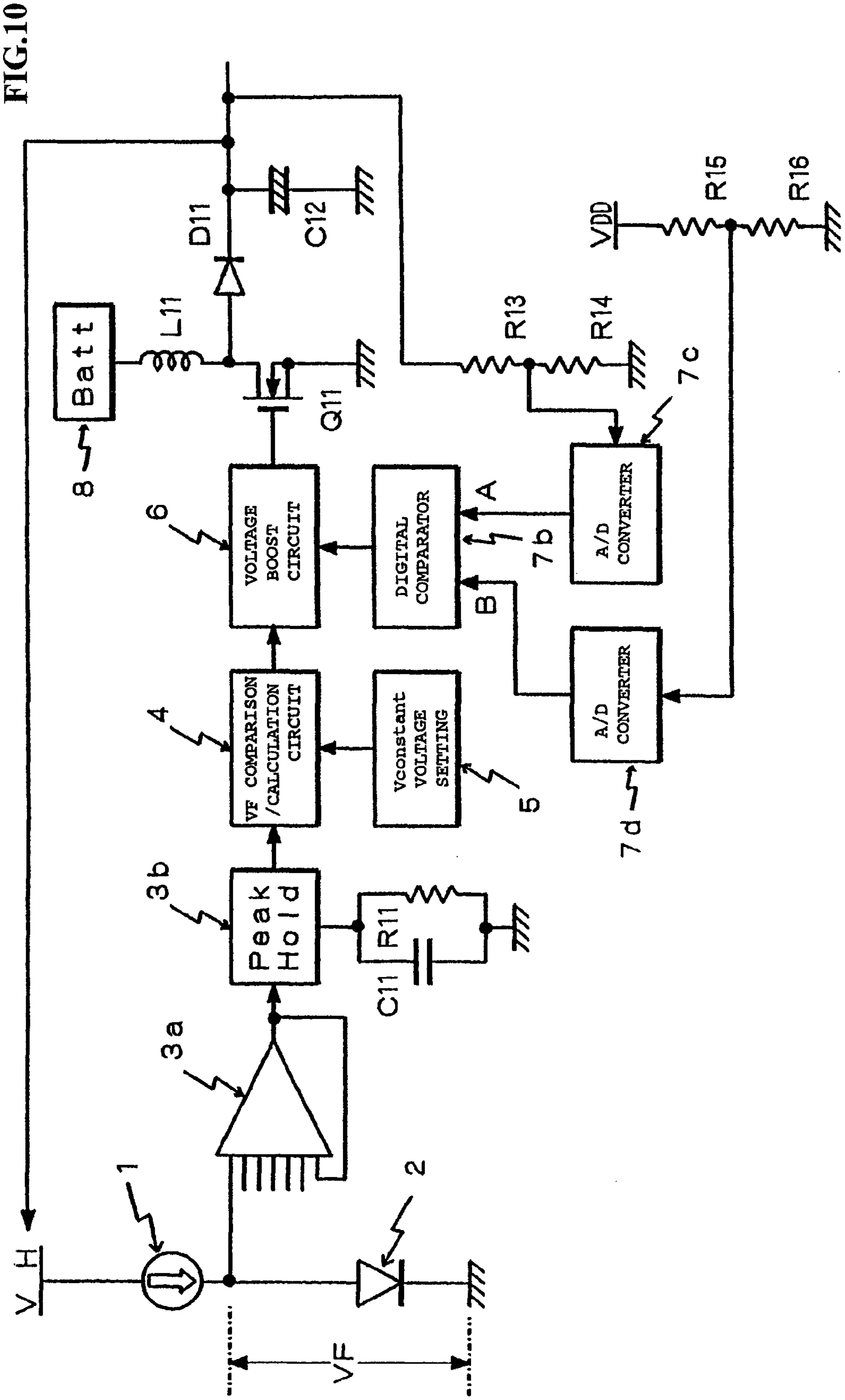
FIG. 10 is a block diagram showing a case where a second example of the voltage limiter is adopted similarly.

Next, FIG. 10 shows a preferred second example of the voltage limiter 7 shown in FIGS. 7 and 8. In FIG. 10, parts corresponding to the respective constituent elements shown in FIG. 9 are designated by the same reference characters and numerals, and therefore detailed explanation thereof will be omitted. In the form shown in this FIG. 10, a digital comparator 7*b* and two A/D converters 7*c*, 7*d* are adopted instead of the analog comparator 7*a* shown in FIG. 9.

The operational voltage VH is divided by the resistance elements R13, R14 to be supplied to the first A/D converter 7*c*, and digital data A outputted from this A/D converter 7*c* is supplied to one input terminal of the digital comparator 7*b*. The voltage obtained by dividing the standard voltage VDD by the resistance elements R15, R16 is supplied to the second A/D converter 7*d*, and digital data B outputted from this A/D converter 7*d* is supplied to the other input terminal of the digital comparator 7*b*.

The digital comparator 7*b* compares the data B as a reference with the data A and operates so as to continue the switching operation performed by the voltage boost circuit 6 in a state that A<B. The digital comparator 7*b* operates so as to stop the switching operation performed by the voltage boost circuit 6 in the case where a state of A>B is detected. Thus, the ON/OFF operation of the power FET Q11 is stopped, and the boost operation for the operational voltage VH is stopped.

Therefore, in the structural example shown in FIG. 10, the digital comparator 7*b*, the two A/D converters 7*c*, 7*d*, and voltage dividing circuits by the respective resistance elements R13, R14 and R15, R16, and the like function as the voltage limiter, thereby operating so as to set an upper limit value of the operational voltage VH. In the structural example shown in FIG. 10, in the case where the switching operation by the voltage boost circuit 6 is stopped by the condition that the digital value is A>B, an operation form in which it is considered that breakdown or running out of lifetime has occurred can be taken.

Figure 11:
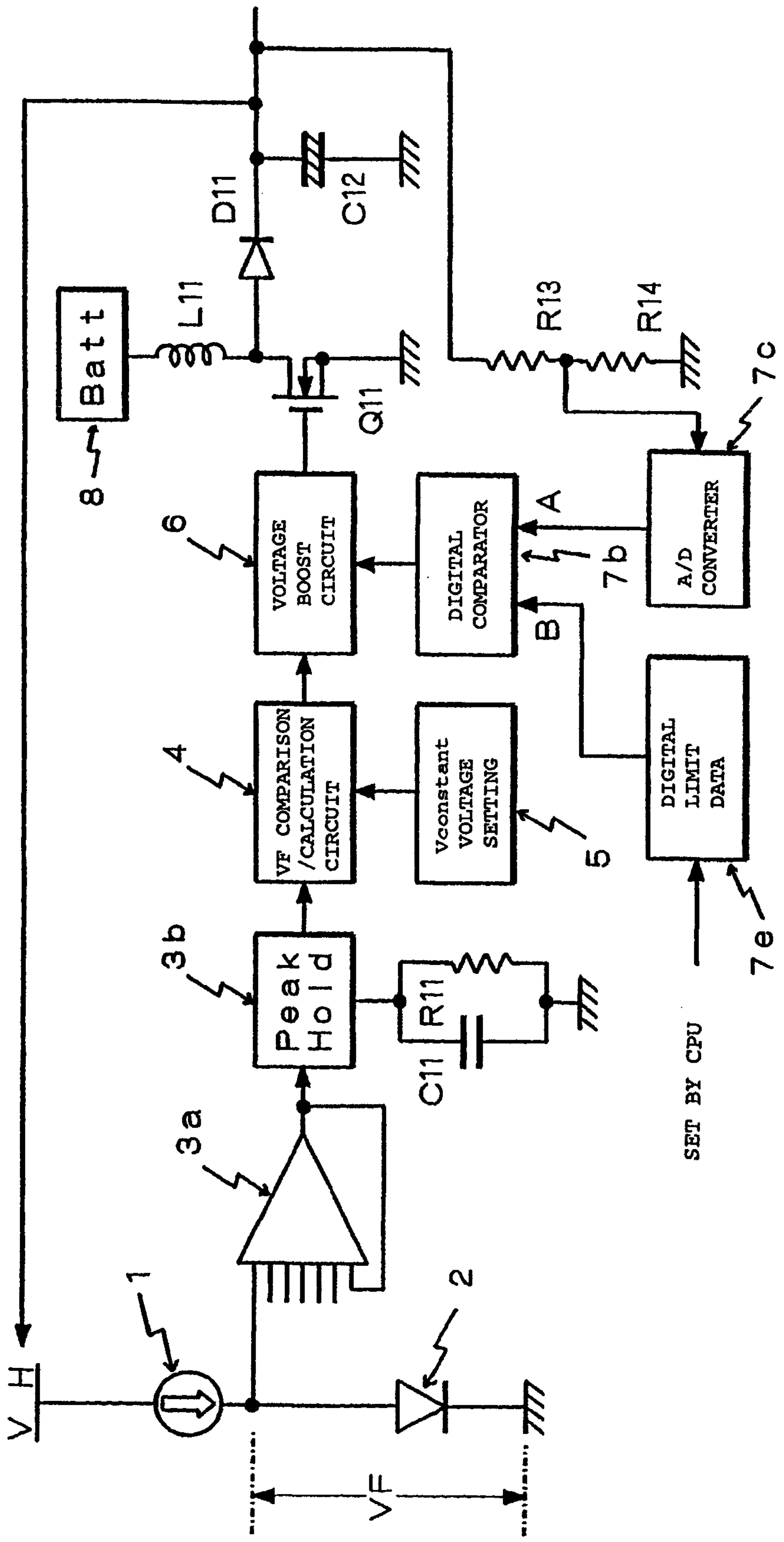
FIG. 11 is a block diagram showing a case where a third example of the voltage limiter is adopted similarly.

FIG. 11 shows a preferred third example of the voltage limiter 7 shown in FIGS. 7 and 8. In FIG. 11, parts corresponding to the respective constituent elements shown in FIG. 10 are designated by the same reference characters and numerals, and therefore detailed explanation thereof will be omitted. In the form shown in this FIG. 11, a generation circuit 7*e* of digital limit data is employed instead of the second A/D converter 7*d* shown in FIG. 10.

This generation circuit 7*e* outputs predetermined digital limit data, that is, digital data B that is to be a comparison object in the digital comparator 7*b* by a command from an unillustrated CPU (central processing unit). In the structural example shown in this FIG. 11, interactions and effects similar to those of the structural example shown in FIG. 10 can be obtained.

Figure 12:
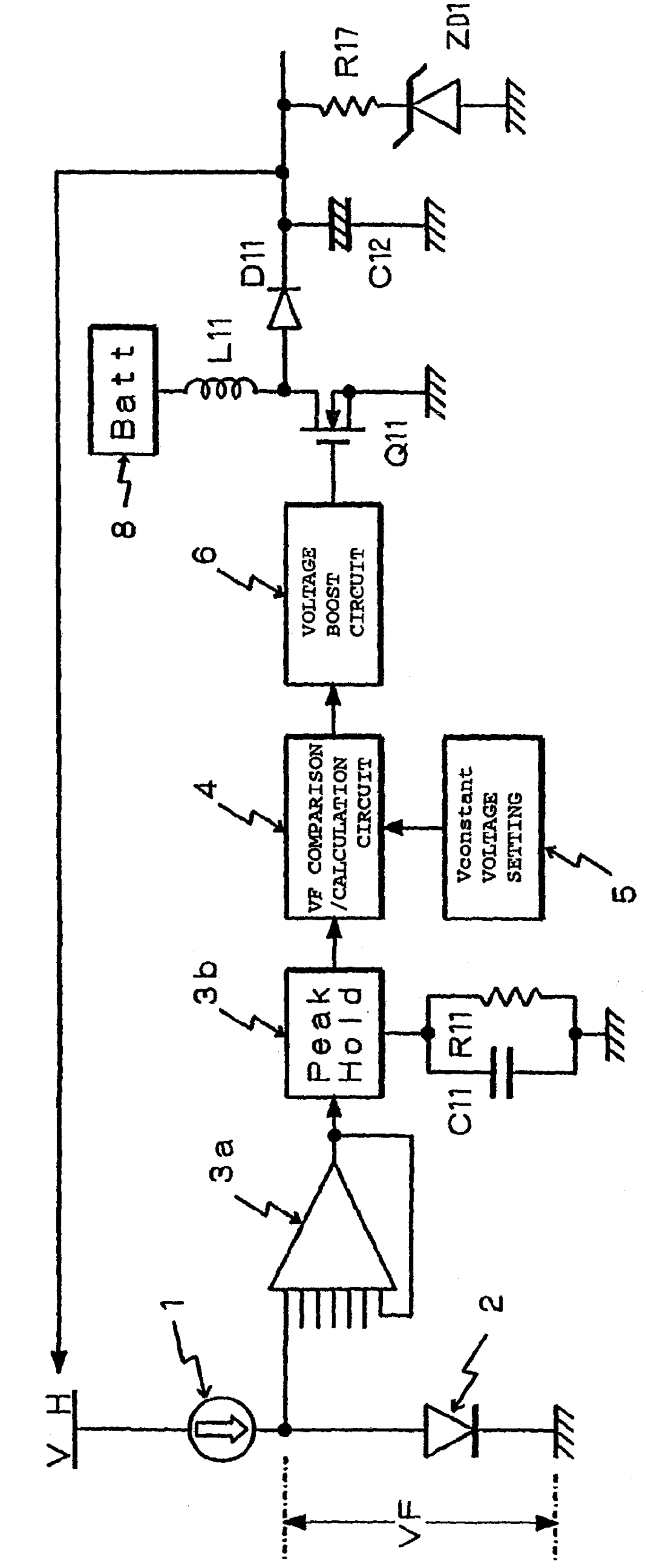
FIG. 12 is a block diagram showing a case where a first example including a switching element in the voltage limiter is adopted.

Next, FIG. 12 has a structure which is provided with the voltage limiter similarly to the embodiments already described and in which this voltage limiter includes a switching element which is turned on when the operational voltage becomes a predetermined value or higher to limit the operational voltage to an upper limit value. In FIG. 12, parts corresponding to the respective constituent elements shown in FIG. 9 are designated by the same reference characters and numerals, and therefore detailed explanation thereof will be omitted.

In the form shown in this FIG. 12, a series circuit composed of a resistance element R17 and a Zener diode ZD1 is connected in parallel to the smoothing capacitor C12 through which the operational voltage VH is generated. The Zener diode ZD1 is turned on when a voltage that is the Zener voltage (breakdown voltage) that this diode has or higher is applied thereto as is well-known. Therefore, with the form shown in FIG. 12, even when an operation that the operational voltage VH is boosted is implemented, an operation that current is sucked via the resistance element R17 is implemented by the ON operation of the Zener diode ZD1, whereby an upper limit value of the operational voltage VH can be set.

With the form shown in this FIG. 12, since an upper limit value of the operational voltage VH can be set by the ON operation of the Zener diode ZD1, even when trouble by which the "VFmax" becomes extremely high occurs, an operation form in which the display device continues to be used as it is can be taken.

Figure 13:
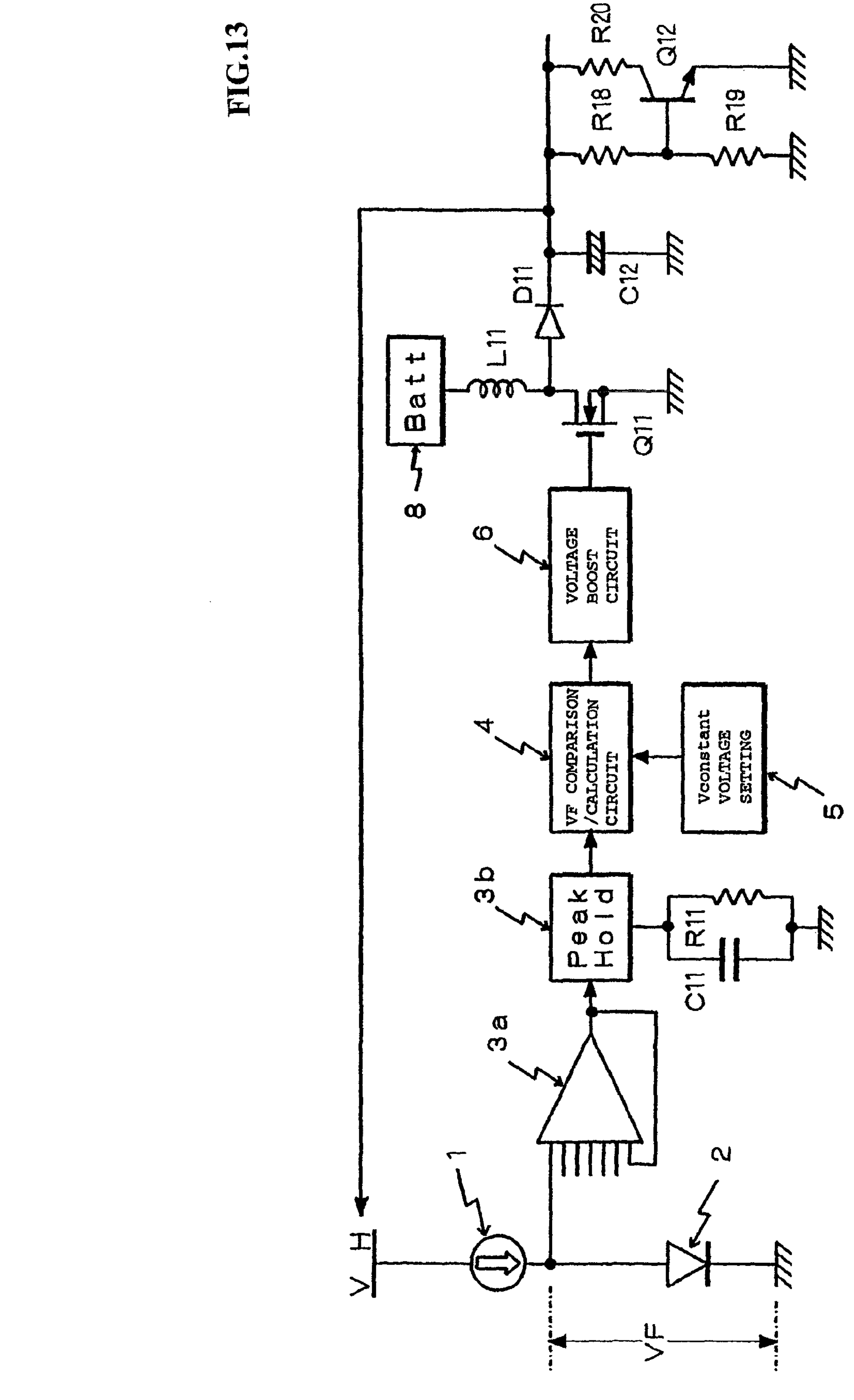
FIG. 13 is a block diagram showing a case where a second example including a switching element in the voltage limiter is adopted similarly.

FIG. 13 shows a structure which includes a switching element which is turned on when the operational voltage becomes a predetermined value or higher, similarly to that of FIG. 12, and which limits the operational voltage to an upper limit value. The form shown in this FIG. 12 is constructed in such a way that an npn type bipolar transistor Q12 as a switching element and resistors R18 to R20 are adopted instead of the circuit structure of the resistance element R17 and the Zener diode ZD1 shown in FIG. 12.

That is, the resistors R18 and R19 connected in series are connected in parallel to the smoothing capacitor C12 through which the operational voltage VH is generated, and the base of the npn type bipolar transistor Q12 is connected to the connection midpoint thereof. The collector of the transistor Q12 is connected to the output terminal of the operational voltage VH in the capacitor C12 via the resistor R20, and the emitter of the transistor Q12 is connected to the reference potential point.

With the above-described structure, when the base voltage which is obtained by division by means of the resistors R18, R19 and which is applied to the transistor Q12 becomes approximately 0.3 volts that is the threshold voltage, the transistor Q12 is turned on, and an operation that current is sucked via the resistor R20 is performed. Thus, an upper limit value of the operational voltage VH can be set. Accordingly, with this structure, by selecting the resistor ratio of the resistors R18 and R19, it becomes possible to set the upper limit value of the operational voltage VH.

Accordingly, with the form shown in this FIG. 13, since the upper limit value of the operational voltage VH can be set by the ON operation of the transistor Q12, even if trouble by which the "VFmax" becomes extremely high occurs, an operation form in which the display device continues to be used as it is can be taken, similarly to the example shown in FIG. 12.

Figure 14:
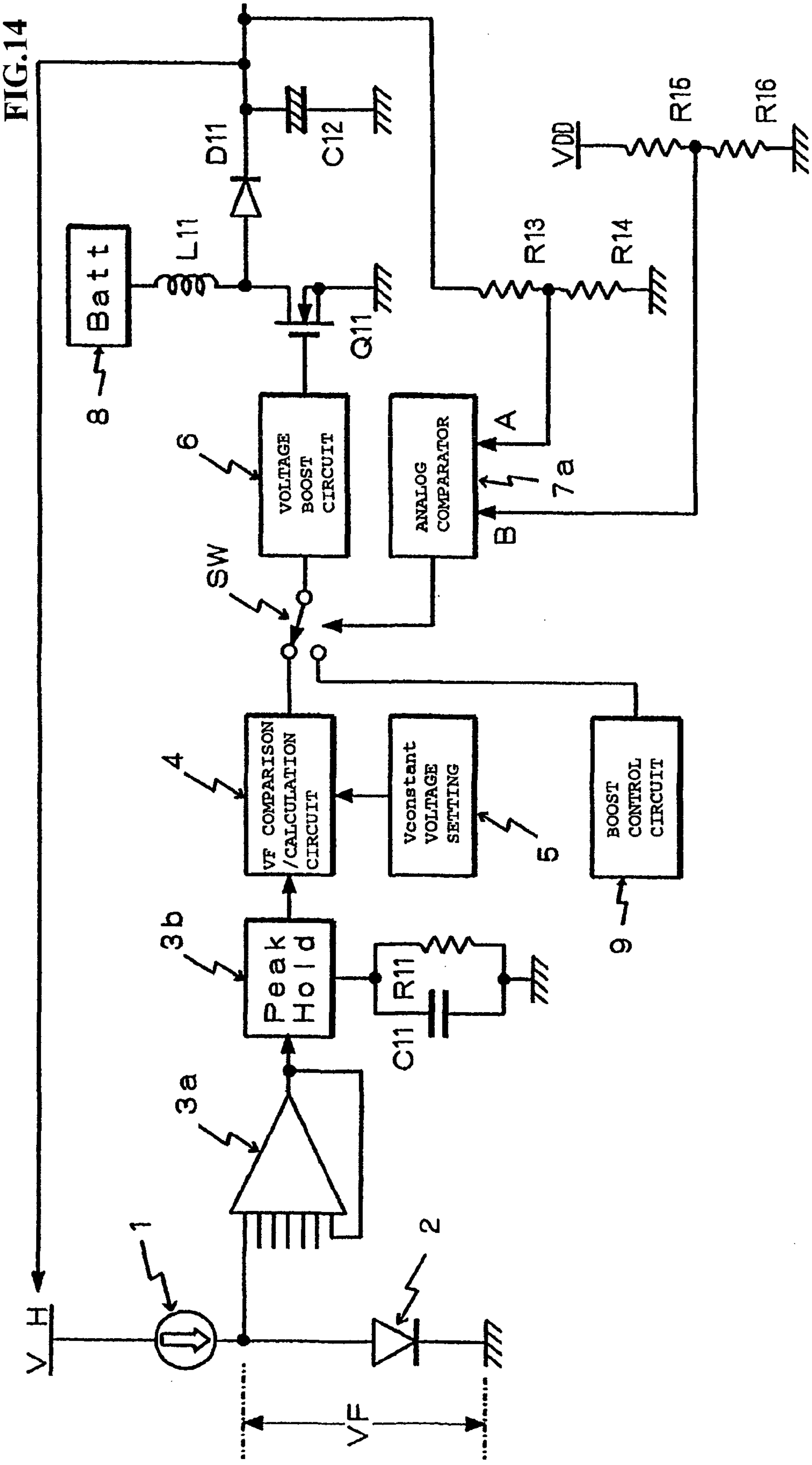
FIG. 14 is a block diagram showing a structure in which a control signal supplied to a switching regulator can be switched to a control signal having a predetermined value.

Next, FIG. 14 shows an example constructed in such a way that in the case where the operational voltage outputted from the power supply circuit reaches a predetermined value, a control signal which is to be supplied to the switching regulator constituting a power supply circuit is switched to a control signal having a predefined value. In this FIG. 14, parts corresponding to the respective constituent elements shown in FIG. 9 are designated by the same reference characters and numerals, and therefore detailed explanation thereof will be omitted.

The structure shown in this FIG. 14 is constructed in such a way that the control voltage supplied from the comparison/calculation circuit 4 or a predetermined control voltage supplied from a boost control circuit 9 is selectively supplied to the voltage boost circuit 6 constituting a switching regulator via a select switch SW. In a state in which the output state of the analog comparator 7*a* maintains the relationship that A<B, the switch SW is in the state shown in FIG. 14. Thus, by the operations of the voltage boost circuit 6, etc., the value of the operational voltage VH is controlled based on the maximum value "VFmax" of the forward voltage VF of the respective light emitting elements.

Meanwhile, in the case where the "VFmax" becomes extremely high due to any of the above-described several causes and as a result the output state of the analog comparator 7*a* becomes the relationship that A>B, the switch SW is switched to a state opposite to the state shown in FIG. 14. Thus, the predetermined control voltage is supplied from the boost control circuit 9 to the voltage boost circuit 6. This control voltage supplied from the boost control circuit 9 is set at a value through which a normal light emission operation in which the value of the operational voltage VH generated based on this control voltage does not damage the light emitting display device can be continued.

The structure shown in FIG. 14 is controlled in such a manner that in the case where the select switch SW is switched to the boost control circuit 9 side by the analog comparator 7*a*, the select switch SW is locked to this switched state. Accordingly, with the structure shown in FIG. 14, in the case where the output state of the analog comparator 7*a* becomes the relationship that A>B, the control voltage supplied from the boost control circuit 9 is supplied to the voltage boost circuit 6 thereafter.

Accordingly, with the form shown in this FIG. 14, even if trouble by which the "VFmax" becomes extremely high occurs, since the switch is switched to an operational voltage VH by which a normal light emission operation which does not damage the light emitting display device can be performed, an operation form in which the display device continues to be used as it is can be taken.

In the embodiment shown in FIG. 14, the analog comparator 7*a* can be replaced with the structure of the digital comparator 7*b* and the first and second A/D converters 7*c*, 7*d* as shown in FIG. 10. In this case, as shown in FIG. 11, the structure in which the second A/D converter 7*d* is replaced with the generation circuit 7*e* of digital limit data can be further adopted.

Although the embodiments described above are explained based on a case where a structure of a conductance control method as shown in FIG. 5 is adopted as light emitting display pixels of an active drive type, the present invention not only can be adopted in a light emitting display device of such a specific structure but also can be similarly adopted in a light emitting display device employing a pixel structure of an active drive type such as for example a voltage write method, a current write method, a drive method of 3 TFT technique realizing digital gradation, that is, SES (simultaneous erasing scan) method, and further a threshold voltage correction method, a current mirror method, and the like.

Although a cathode line scan/anode line drive method is exemplified in a passive drive type light emitting display device shown in FIG. 6 already described, the present invention also can be adopted in a passive drive type display device of an anode line scan/cathode line drive method. A structure of this case is constructed in such a manner that the forward voltages VF of respective light emitting elements generated between drive lines (data lines) of a cathode line side and a reference potential are supplied to the multi-input comparator 3*a*.

What is claimed is:

1. A self light emitting type display device comprising:

light emitting elements which are respectively connected between a plurality of data lines and a plurality of scan lines at respective intersecting positions between the data lines and the scan lines;

a voltage detection circuit that obtains a maximum value of forward voltages drawn from the light emitting elements through the respective data lines;

a power supply circuit which controls an operational voltage given to the light emitting elements based on the maximum value of the forward voltages; and a voltage limiter which can set an upper limit value of the operational voltage outputted from the power supply circuit.

2. The self light emitting type display device according to claim 1, wherein the power supply circuit controls an operational voltage of a constant current circuit which gives drive current to the data lines based on the maximum value of the forward voltages.

3. The self light emitting type display device according to claim 1, wherein the voltage limiter controls a switching characteristic of a switching regulator constituting the power supply circuit.

4. The self light emitting type display device according to claim 1, wherein the voltage limiter includes a switching element which performs an ON operation at the time the operational voltage from the power supply circuit becomes a predetermined value or higher to limit the operational voltage to the upper limit value.

5. The self light emitting type display device according to claim 1, wherein a control signal supplied to a switching regulator constituting the power supply circuit has a predetermined value in a case where the operational voltage outputted from the power supply circuit reaches a predetermined value.

6. The self light emitting type display device according to any one of claims 1 to 5, wherein the light emitting elements in the light emitting display pixels are constituted by organic EL elements in which an organic compound is employed in a light emitting layer.

* * * * *